US006961999B2

(12) United States Patent
Shook

(10) Patent No.: US 6,961,999 B2
(45) Date of Patent: Nov. 8, 2005

(54) LIGHTWEIGHT BICYCLE WHEEL RIM AND METHOD FOR PRODUCING IT

(76) Inventor: William B Shook, 3917 E. Eden Rock Cir., Tampa, FL (US) 36534

( * ) Notice: Subject to any disclaimer, the term of this patent is extended or adjusted under 35 U.S.C. 154(b) by 0 days.

(21) Appl. No.: 10/373,474

(22) Filed: Feb. 25, 2003

(65) Prior Publication Data

US 2004/0163255 A1 Aug. 26, 2004

(51) Int. Cl.$^7$ ................................................. B21K 1/38
(52) U.S. Cl. ............................. 29/894.35; 29/894.33; 29/894.353
(58) Field of Search ..................... 29/894.33, 894.35, 29/894.353, 894.354; 301/95.104, 95.106, 95.107

(56) References Cited

U.S. PATENT DOCUMENTS

| 5,499,864 | A | * | 3/1996 | Klein et al. | ............ | 301/95.104 |
| 5,651,591 | A | | 7/1997 | Mercat et al. | | |
| 6,138,730 | A | * | 10/2000 | Fotij et al. | .................. | 152/398 |
| 6,186,598 | B1 | * | 2/2001 | Chen | ........................... | 301/58 |
| 6,213,562 | B1 | * | 4/2001 | Muraoka et al. | .............. | 301/61 |
| 6,402,256 | B1 | * | 6/2002 | Mercat | .................. | 301/95.104 |

FOREIGN PATENT DOCUMENTS

| EP | 0579525 | | 1/1994 | | |
| EP | 0715001 | | 6/1996 | | |
| JP | 58025835 | A * | 2/1983 | ............ | B21H/1/10 |
| JP | 58061938 | A * | 4/1983 | ........... | B21D/53/30 |

* cited by examiner

*Primary Examiner*—Essama Omgba
(74) *Attorney, Agent, or Firm*—David C. Purdue; John C. Purdue

(57) ABSTRACT

A deep V-section aero rim for a tensioned spoke wheel and a method for producing it are disclosed. The rim is produced by extruding an alloy to produce a rim profile, rolling the extrusion, cutting the rolled extrusion to length, joining the free ends to produce a rim blank and mechanically reducing the thickness of the rim side walls a substantial amount. In one embodiment, each of the side walls, after extrusion, has a thickness that is sufficient to withstand buckling of the side walls during rolling. After rolling and cutting the extrusion to length, its ends are joined and each side wall, namely, the portion between the rim floor and the braking surface, is thinned, preferably by mechanical abrasion, until each side wall is so thin that an extrusion having side walls of that thickness could not be rolled without side wall buckling. In another embodiment, flanges on the outside of the side walls prevent buckling during rolling and the flanges are removed after rolling.

3 Claims, 2 Drawing Sheets

LIGHTWEIGHT BICYCLE WHEEL RIM AND METHOD FOR PRODUCING IT

CROSS-REFERENCE TO RELATED APPLICATION

Not applicable

STATEMENT CONCERNING FEDERALLY SPONSORED RESEARCH OR DEVELOPMENT

Not applicable

REFERENCE TO A "SEQUENCE LISTING"

Not applicable

BACKGROUND OF THE INVENTION (1) Field of the Invention

The present invention relates generally to rims for wheels for human powered vehicles such as bicycles, wheel chairs and the like, and especially to a novel rim and method for producing it.

(2) Description of Related Art Including Information Disclosed Under 37 CFR 1.97 AND 37 CFR 1.98

A great deal of effort has been directed to reducing the weight of human powered wheel rims, especially bicycle wheel rims. Bicycle wheel rims are typically produced by extruding aluminum alloy or the like to produce a linear extrusion having a cross section corresponding with the finished rim, rolling the extrusion into a circular shape, cutting the extrusion to length and connected the free ends with pins, plugs or welds. In the case of deep V-shaped, aero rims, the rolling of the linear extrusion imposes enormous forces on the extrusion. These forces far exceed the forces which the finished rim must endure in use on a bicycle. Consequently, the thicknesses of the rim walls tend to be greater than the thickness required for service as a bicycle wheel. Typical rim side wall thicknesses for a bicycle wheel rim tend to be at least about 1 mm.

European Patent No. 0 715 001 discloses a technique for producing a bicycle wheel rim involving the production of a linear extrusion, rolling the extrusion, cutting the extrusion to length and connecting the free ends to produce a rim blank. The thickness of the walls of the blank exceed the desired wall thickness for a finished rim and the blank is immersed in a caustic chemical to remove metal from the rim until a desired wall thickness is achieved. The rim is then rinsed, immersed in a neutralizing bath and rinsed a second time. This method reduces the thickness of the rim blank walls generally uniformly.

U.S. Pat. No. 5,651,591 discloses a bicycle wheel rim having a lower bridge or rim floor having a thickness of less than about 0.7 mm. According to the patent, the rim blank is extruded with side walls (wings) and a lower flange (lower bridge) that are thicker than the final dimensions. After the extrusion is rolled, cut and joined, the rim blank is machined by chemical machining, to reduce uniformly the thickness of the wings and bridges, or mechanically machined to reduce the thickness of the lower bridge and the wings. The mechanical machining is carried out by milling, turning or grinding.

European Patent No. 0 579 525 discloses a rim production technique according to which an extrusion is rolled and cut to length and the ends are joined to produce a rim blank. The rim blank is then machined to form two opposed braking surfaces by machining material off of two opposed flanks. The machining can be carried out by turning or using a cutter.

Rims are polished after they are fabricated. The entire exterior surface of the rim is polished and only a very minimal amount of material is removed from the rim.

Deep V-section rims or aero rims pose unique fabrication challenges. When the linear extrusion is rolled, the side walls must withstand enormous forces which tend to buckle the side walls as the extrusion is rolled. These forces are much greater than the forces encountered by the rim in use on a bicycle, even in a high tension, low spoke count wheel. Consequently, deep V-section aero rims have side walls that are as thick as they need to be to survive the rolling operation but are substantially thicker than they need to be to hold up in service. Thus, there is a weight penalty associated with deep V-section aero rims and, because the weight is at or near the outermost portion of the wheel, it severely degrades the rotational inertia properties of the wheel.

BRIEF SUMMARY OF THE INVENTION

The present invention is a deep V-section aero rim for a tensioned spoke wheel and a method for producing it. The rim is produced by extruding a suitable alloy into a rim profile, rolling the extrusion, cutting the rolled extrusion to length, joining the free ends to produce a rim blank and mechanically reducing the thickness of the rim side walls, i.e., the side walls which extend from the rim floor to the brake surfaces. In a typical embodiment, each of the side walls, after extrusion, has a thickness of about 1.2 mm. This is sufficient to withstand buckling of the side walls during rolling of the linear extrusion. After the extrusion is rolled and cut to length and its ends are joined, most of a portion of each side wall, namely, the portion between the rim floor and the braking surface, is thinned, preferably by mechanical abrasion, until the thickness of each side wall is about 0.6 or 0.7 mm in a typical embodiment.

Accordingly, it is an object of the present invention to provide an improved rim for bicycle wheels.

It is a further object of the invention to provide a simple method for producing an improved rim.

It is a further object of the present invention to provide a rim with a side wall thickness less than that required to roll the extrusion from which it is made.

These and other objects and advantages of the present invention will be fully appreciated by those skilled in the art upon reviewing the disclosures herein.

DETAILED DESCRIPTION OF THE PREFERRED EMBODIMENTS

Figure 1:
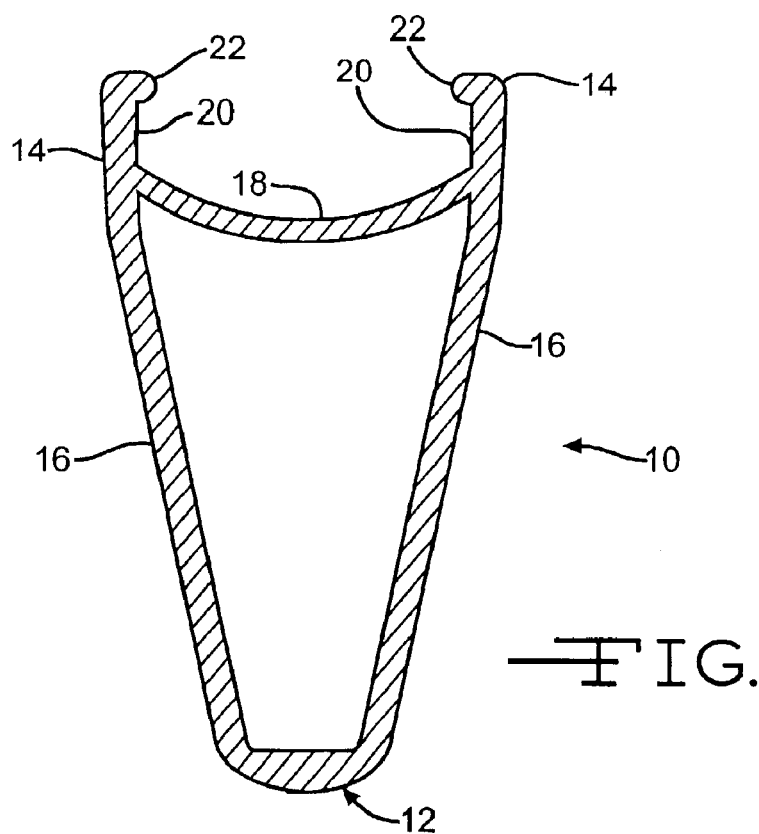
FIG. 1 is a cross-sectional view of a linear extrusion for producing an aero rim according to the present invention.

Referring to FIG. 1, a linear extrusion indicated at 10 comprises a rim floor or spoke bed 12, two opposed brake surfaces 14 and two opposed side walls 16 extending between the spoke bed 12 and the brake surfaces 14. A transverse flange 18 extends between the upper portions of the extrusion 10, adjacent to the brake surfaces 14. Tire flanges 20 extend upwardly from the transverse flange 18 and terminate in tire bead hooks 22. The side walls 16 have a thickness corresponding, generally, with the thickness of the extrusion 10 adjacent to the brake surfaces 14. In practice, this thickness might be about 1 mm or more, preferably about 1.2 mm. Such thicknesses have been found to be sufficient to prevent buckling of the side walls 16 when the extrusion 10 is rolled to produce a rim, even when the extrusion is very tall, such as 34 mm, from the rim floor to the top of the tire flanges 20.

Figure 2:
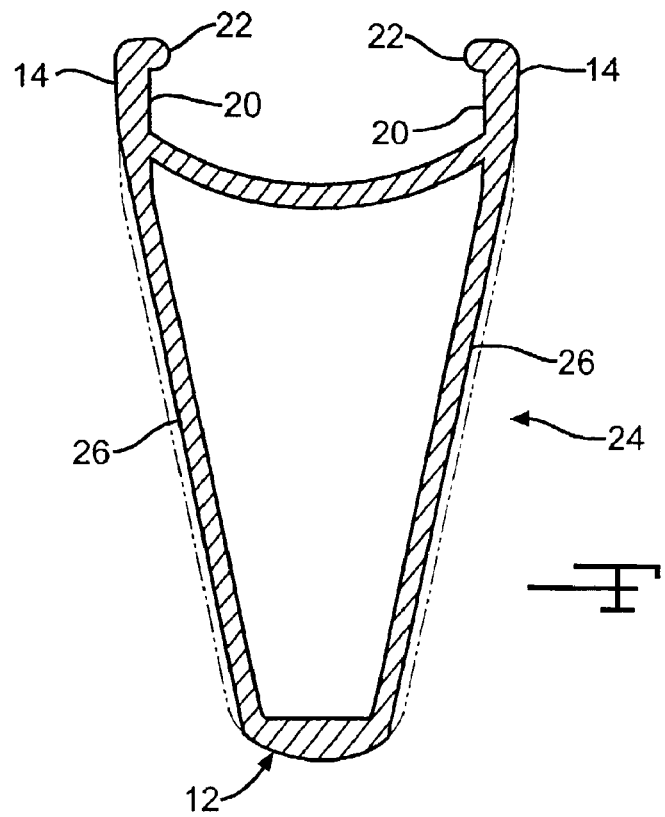
FIG. 2 is a cross-sectional view of a finished aero rim according to the present invention.

In FIG. 2, a rim, indicated at 24, has modified sidewalls 26. It can be seen that the thicknesses of the side walls 26 are substantially less than the thicknesses of the side walls 16 shown in FIG. 1 for the extrusion 10. According to a preferred method for producing the rim 24, the extrusion 10 is rolled and cut to the length required to produce a rim. The free ends of the rolled extrusion are connected by any suitable means, including, but not limited to, a plug connection, pinning or welding, to produce a rim blank. The thicknesses of the side walls 16 of the linear extrusion are controlled so that they equal or exceed the thicknesses required to prevent buckling of the side walls 16 during the rolling step. That thickness can be determined by trial and error and will depend, in large part, upon the height of the extrusion, the extrusion material and the presence or absence of other buckling prevention features, some of which are discussed below.

The rim blank is then put into a standard rim polishing apparatus (not shown). However, instead of the very lightly abrasive polishing tools, a moderately or highly abrasive tool is substituted and substantial material is removed from the side walls 16 to produce the side wails 24, before polishing. Excellent results have been achieved with an abrasive tool comprising a sanding flap wheel, i.e., a wheel with flaps of sanding cloth around the periphery of the wheel. Excellent results have been achieved using 80 grit sanding cloth flaps. Other aggressively abrasive tools may be employed, however. For example, a stiff wire brush wheel might be employed. It is highly desirable to use an abrasive tool that, like a sanding flap wheel, is operable to apply a fairly even abrasion pressure over a substantial area on a non-planar surface. For example, a belt sander having a pad or roller contoured to match the contour of the side wall could be used. In that case, because the sanding cloth would be backed up by the pad or roller, the position of the pad or roller can be controlled so as to control the amount of material that is removed from the rim blank side wall. As material is removed, the pressure of the sanding cloth against the side wall will be reduced until there isn't enough pressure to remove more material. A contoured grinding wheel could also be used although measures, known to those skilled in the art, would have to be taken to minimize clogging of the grinding wheel. Yet another method for removing a predetermined amount of material from the side wall is electrical discharge machining (EDM) where an electrode is positioned next to the side wall in a bath of oil and sparks are generated from the electrode that travel to the side wall removing material from the side wall. These and other methods known to those having ordinary skill in the art may be employed within the broad scope of the present invention. Sanding cloth is preferred and, at this point, it is believed that a contoured belt sander may be the best way to remove material from the side wall.

According to the invention, the thicknesses of the side walls 16 are reduced by abrasion to produce side walls 26, which have thicknesses below the thickness required to prevent buckling during the extrusion rolling step. In any case, at least five percent (5%) of the weight of the rim blank and, preferably ten percent (10%) and, even more preferably, at least fifteen percent (15%) of the weight of the rim blank is removed by abrasion.

EXAMPLE I

A linear extrusion having the profile shown in FIG. 1 was produced from a largely conventional 6061 aluminum alloy. The height of the extrusion, from the rim floor to the tire bead was 34 mm. The width of the extrusion, at the top adjacent to the tire flanges, was 19 mm. The thickness of the rim floor, at the center, was 2.1 mm. The side walls had a generally uniform thickness of about 1.2 mm. The thickness of the extrusion adjacent to the brake surfaces was 1.3 mm. The linear extrusion was rolled into a rim shape and cut to length. The ends were joined by a plug to produce a rim blank that weighed approximately 560 grams. The rim blank was mounted in a conventional rim polishing machine. The conventional polishing tool was replaced with a sanding flap wheel. Wheel had a width of about 20 mm. The flap wheel was rotated so that the sanding flaps struck the side wall 16 and the rim blank was rotated so that the roller brush traversed the entire side wall on one side of the rim blank several times. After a suitable time and a suitable number of revolutions of the rim blank, the rim blank was removed from the polishing machine and weighed. This process was continued until the weight of the rim blank had been reduced by about 50 grams or about nine percent (9%). The rim blank was removed from the polishing machine and reversed so that the flap wheel contacted the other side wall. The foregoing process was repeated until the weight of the rim blank had been reduced by about 50 more grams. At this point, the side walls had an average thickness of less than 0.8 mm. The rim was then polished, anodized, drilled and assembled into a bicycle wheel. The rim performed well and had more than adequate strength to withstand the rigors of dynamic and static loads imposed on it. It has been determined that a linear extrusion having the above recited dimensions except having side walls that were 0.8 mm thick could not have been rolled into a 700 c rim without unacceptable buckling of the side walls.

Some bicycle wheels have spokes that are connected to the side walls of the rims. Such rims must have side walls that are fairly thick, at least where the spokes connect to them, in order to support the spokes and prevent them from pulling through the side walls. The present method for producing rims can be readily adapted to producing lighter weight rims for such wheels. Instead of uniformly reducing the thickness of the rim side walls, the portions of the rim side walls between spoke connection points can be reduced in thickness, leaving a thicker side wall portion at the spoke connection points, as needed for strength. Alternatively, a depression or dimple could be formed in the side wall at each spoke connection point. The depth of the depression could be controlled so that outer surface of the depressed area is at the height of the outer surface of the side wall after it has been thinned to a desired thickness. After the side wall is deformed in the vicinity of the spoke connection points, material can be uniformly removed from the side wall reducing the thickness of the side wall except in the vicinity of the depression that was previously formed. Material removal can be continued until the depression can no longer be seen which would mean that the desired thickness has been reached.

It will be appreciated that one may employ methods other than weighing to keep track of how much material has been removed from the rim blank side walls by abrasion. For example, but not by way of limitation, one might employ an ultrasonic thickness gauge to track the changes in thickness of the side walls and stop removing material when a desired thinness has been achieved. Alternatively, an electromagnetic acoustic thickness gauge may be employed. It is also contemplated that a groove might be formed in the side wall and be used to control the extent of material removal. For example, but not by way of limitation, a groove having a predetermined depth can be formed in the side wall, preferably after the extrusion has been rolled. The depth can be set so that, when enough material has been removed so that the groove is no longer present, material removal can be stopped. This groove depth can be controlled so that the final thickness of the side walls when the groove disappears coincides with a desired side wall thickness. Other means for monitoring the degree or rate of removal of material from the side walls will no doubt occur to those skilled in the art and are intended to be encompassed within the broad parameters of the subject invention.

Figure 3:
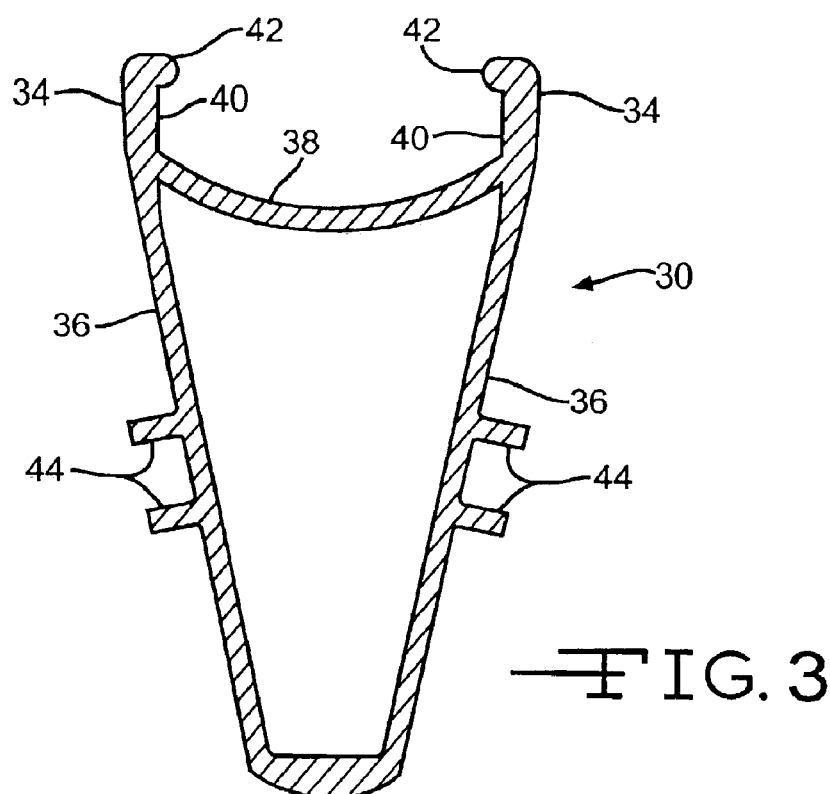
FIG. 3 is a cross-sectional view of a second embodiment of a linear extrusion for producing an aero rim according to a second embodiment of the present invention.
Figure 4:
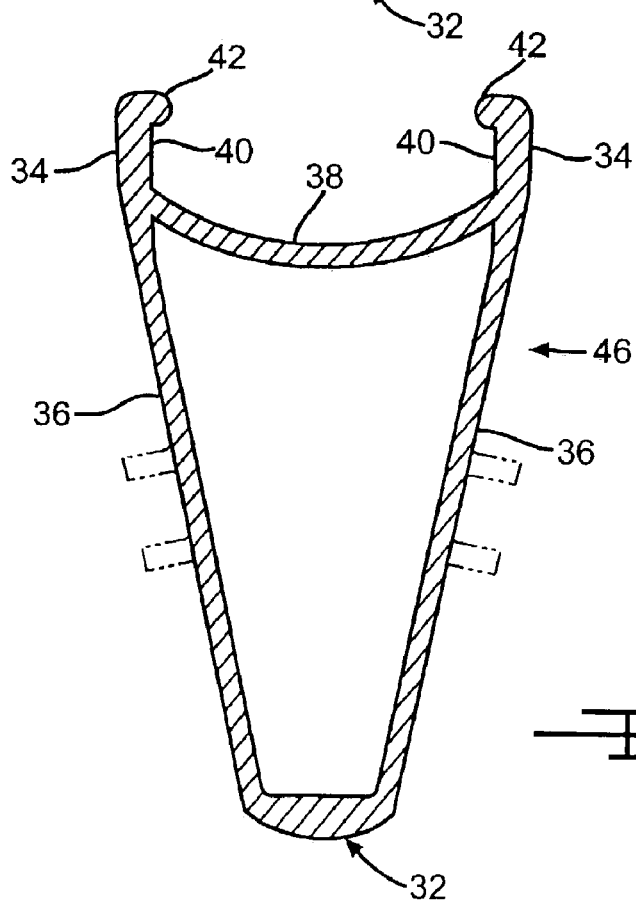
FIG. 4 is a cross-sectional view of a finished rim according to the second embodiment of the invention.

A second embodiment of a method for producing a rim according to the present invention will now be described with reference to FIG. 3 where a linear extrusion is indicated generally at 30. The linear extrusion 30 comprises a rim floor or spoke bed 32, two opposed brake surfaces 34 and two opposed side walls 36 extending between the spoke bed 32 and the brake surfaces 34. A transverse flange 38 extends between the upper portions of the extrusion 30, adjacent to the brake surfaces 34. Tire flanges 40 extend upwardly from the transverse flange 38 and terminate in tire bead hooks 42. The side walls 36 have a thickness that is substantially less than the thickness of the extrusion 30 adjacent to the brake surfaces 34. Generally, the thickness of the side walls 36 is less than the thickness required in them to withstand the rigors of rolling of the linear extrusion into the shape of a rim. However, each side wall 36 is extruded with at least one flange 44 extending outwardly there from. In the embodiment shown in FIG. 3, a pair of circumferential flanges 44 extends outwardly from each side wall 36. These flanges 44 reinforce the sidewalls during rolling of the linear extrusion 30 to prevent buckling of the side walls 36. After the extrusion 30 is rolled, cut to size and the ends are joined, the flange or flanges 44 are removed by machining or, preferably, by abrasion, to produce a rim 46 shown in FIG. 4.

The foregoing description is intended to enable one of ordinary skill in the art to practice the invention and to set forth the best mode known for carrying out the invention.

I claim:

1. A method for producing a rim for a bicycle wheel, said method comprising the steps of producing a linear extrusion having a spoke bed, opposed brake surfaces, and opposed side walls that extend between the spoke bed and the brake surfaces, each of the side walls having a thickness to withstand rolling of the extrusion into a rim shape without buckling, rolling the linear extrusion shape a portion thereof into a rim blank with a free end, cutting the rolled extrusion to produce a rim blank with adjacent free ends, and connecting the free ends to produce the blank, and removing material from side walls of the rim blank to produce a rim having side walls of such a thickness that a linear extrusion, corresponding with the linear extrusion except for having side walls of that thickness, could not be rolled to produce a rim blank without buckling of the side walls.

2. The method claimed claim 1 wherein the rim blank is periodically weighed to keep track of how much material has removed from the side walls of the rim blank.

3. A method for producing a rim for a bicycle wheel, said method comprising the steps of producing a linear extrusion having a spoke bed, opposed brake surfaces and opposed side walls that extend between the spoke bed and the brake surfaces, the side walls being too thin to withstand rolling of the extrusion into a rim shape without buckling, but having flanges extending outwardly therefrom, said flanges being operable, when the extrusion is rolled into a rim shape, to prevent the side walls of the extrusion from buckling, rolling the linear extrusion shape a portion thereof into a rim blank with a free end, cutting the rolled extrusion produce a rim blank with adjacent free ends and connecting the free ends to produce the blank, and removing the flanges from the side walls of the rim blank to produce a rim having side walls that are so thin that an extrusion corresponding with the linear extrusion but without the flanges and having side walls as thin as those of the rim could not be rolled to produce a rim blank without buckling of the side walls.

* * * * *